United States Patent [19]

Beikirch et al.

[11] Patent Number: 4,864,415
[45] Date of Patent: Sep. 5, 1989

[54] SLOW SCAN REGISTRATION SELF ALIGNMENT SYSTEM FOR RASTER INPUT SCANNERS

[75] Inventors: Thomas R. Beikirch, Webster; Gregory E. Bell, Rochester, both of N.Y.

[73] Assignee: Xerox Corporation, Stamford, Conn.

[21] Appl. No.: 190,184

[22] Filed: May 4, 1988

[51] Int. Cl.$^4$ .......................... H04N 1/04; H04N 1/12
[52] U.S. Cl. ..................................... 358/474; 250/578; 358/447; 358/486; 358/494
[58] Field of Search ............... 358/285, 282, 284, 288, 358/293; 356/375; 250/578

[56] References Cited

U.S. PATENT DOCUMENTS

| 3,658,430 | 4/1972 | Rashkin | 356/172 |
| 4,370,059 | 1/1983 | Masuda | 356/400 |
| 4,518,999 | 5/1985 | Kurata et al. | 358/285 |
| 4,538,185 | 8/1985 | Wiggins | 358/285 |
| 4,724,330 | 2/1988 | Tuhro | 250/578 |
| 4,748,514 | 5/1988 | Bell | 358/285 |
| 4,749,872 | 6/1988 | Asada et al. | 358/293 |

Primary Examiner—Edward L. Coles, Sr.
Assistant Examiner—Kim Yen Vu
Attorney, Agent, or Firm—Frederick E. McMullen

[57] ABSTRACT

A system for self-aligning a raster input scanner in the slow scan direction where, at start of scan, a target having a variable density image is scanned first until a preset target image line is obtained and the position of the scan carriage registered; then from the registered position, the platen is scanned through a predetermined number of scan lines; following this, the carriage is reversed and returned the same number of scan lines where the target is again scanned and the target image line obtained compared with the previous target image line to determined if a valid scan cycle has taken place.

10 Claims, 4 Drawing Sheets

SLOW SCAN REGISTRATION SELF ALIGNMENT SYSTEM FOR RASTER INPUT SCANNERS

The invention relates to raster input scanners, and more particularly, to a slow scan registration self alignment system for raster input scanners.

Raster input scanners typically employ one or more arrays such as CCD's for scanning. The array converts each scanned image line into a series of charges which, following suitable processing, are output as image signals or pixels to an end user. Scanners of this type often use a transparent platen on which the image bearing document is placed face down. The scanning array is carried on a carriage which traverses back and forth under the platen to provide the necessary relative motion between image and array. Scanning optics focuses the array onto the image, and one or more lamps are provided to illuminate the image.

In the typical scanning process, the image area viewed by each of the array photosensors is converted into a charge potential representative of the image gray level. Scanning takes place during an integration period of preset duration. Following integration, the image charges are transferred to a pair of analog shift registers, the operating sequence being such that during the integration period, the image charges from the previously scanned line are clocked from the shift registers, leaving the shift registers free to receive the image charges from the next integration period. The duration of the integration period, which must be sufficiently long to fully integrate the image line being scanned, yet not so long as to allow the array photosensors to become saturated, is measured by periodic fixed rate clock signals.

In current document scanners on the market today, registering a document with respect to the scanning optics is an important concern since the scan should be repeatable and only the document and not adjacent areas such as the platen borders, the scanner's covers, etc. scanned. Typically, this involves placing some form of limit switch to detect the presence of the scan carriage to a tight tolerance or else providing some way to mechanically adjust the switch during manufacture and subsequent service calls. The first method involves high cost materials while the second, which is labor intensive, is also costly.

In the prior art, U.S. Pat. No. 3,658,430 to Rashkin discloses an apparatus for locating and displaying the position of a registration mark on a tile sheet in which a series of individual fiber optic type light guides are arranged to scan the tile sheet in search of the registration mark thereon, each light guide serving a photocell detector set to detect a light level corresponding to the presence or absence of the registration mark. To identify the light guide positions, each photocell of the Rashkin patent has a preselected signal voltage. U.S. Pat. No. 4,370,059 to Masuda provides a system to locate an opaque object which has a transparent registration mark. A pair of photoelectric detectors are employed which view the object under light, the detector pair responding to the presence or absence of light to identify when the object is in the desired position. And U.S. Pat. No. 4,538,185 to Wiggins discloses a special reflective platen cover for use in determining the position of a document original on the platen of a scanner.

In contrast, the present invention provides a process for operating a raster input scanner having a platen for supporting image bearing documents to be scanned, a movable scan carriage; scanning means on the carriage with at least one scanning array, lamp means for illuminating the document, and optical means for focusing an image line on the array; and a registration target providing a predetermined target image in the scan path of the scanning means adjacent the platen; the steps comprising: in response to a start of scan signal, actuating the scanning means and moving the carriage to scan the target image before scanning the platen; on output of image signals representing a preset target image, registering the position of the carriage; actuating the scanning means and moving the carriage from the registration position to scan the platen while counting each line scanned until a preset number of lines are scanned; on scanning of the preset number of lines, moving the carriage in the opposite direction while again counting each line scanned; on scanning the preset number of scan lines, stopping the carriage; rescanning the target image to provide image signals representing a return target image; and comparing the return target image with the preset target image to verify that the position to which the carriage is returned and the registration position are one in the same.

The present invention further provides a scanner having the combination of: a platen on which documents are placed for scanning; a scan carriage; image scanning means on the carriage with at least one array of photosensors, lamp means for illuminating a line-like area of the platen for scanning by the array, and optical means for focusing the line-like area on the array; reversible drive means for moving the carriage; control means for operating the drive means and the scanning means; a registration target having a predetermined target image in the scan path of the scanning means adjacent the platen, the control means on a start of scan signal actuating the scanning means and the drive means to move the carriage so that the scan means scans the target image prior to scanning the platen; means responsive to output of a preset target image by the scanning means to register the position of the carriage; counting means for counting each line scanned by the scanning means as the scanning means scans the platen, the control means actuating the drive means to move the carriage in the opposite direction back toward the carriage registration position in response to the counting means counting a predetermined number of scan lines, the control means inactivating the drive means to stop the carriage in response to the counting means counting the predetermined number of scan lines while maintaining the scanning means operative to re-scan the target image and provide a second target image; and means for comparing the preset target image with the second target image to verify that the carriage is returned to the registration position.

IN THE DRAWINGS

Figure 1:
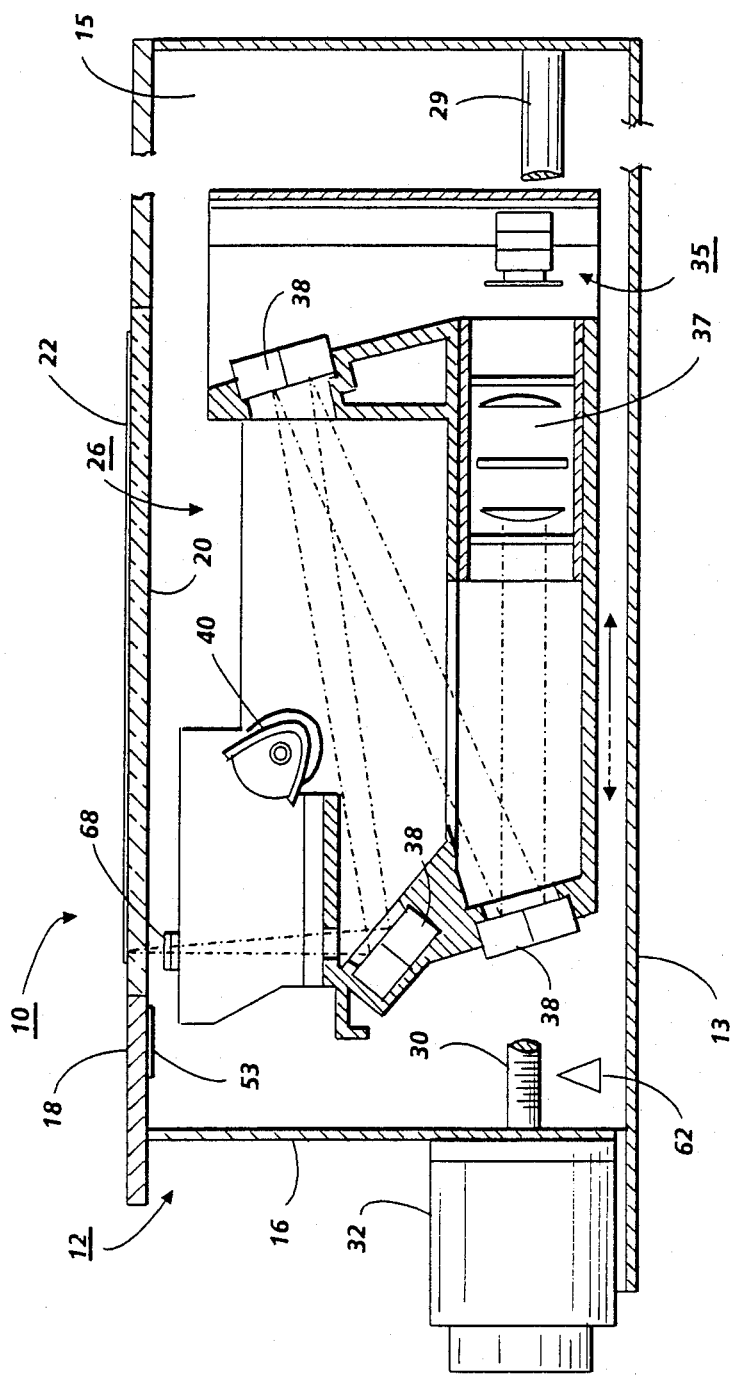
FIG. 1 is a schematic view of a raster input scanner of the type adapted to incorporate the slow scan registration self alignment system of the present invention.
Figure 2:
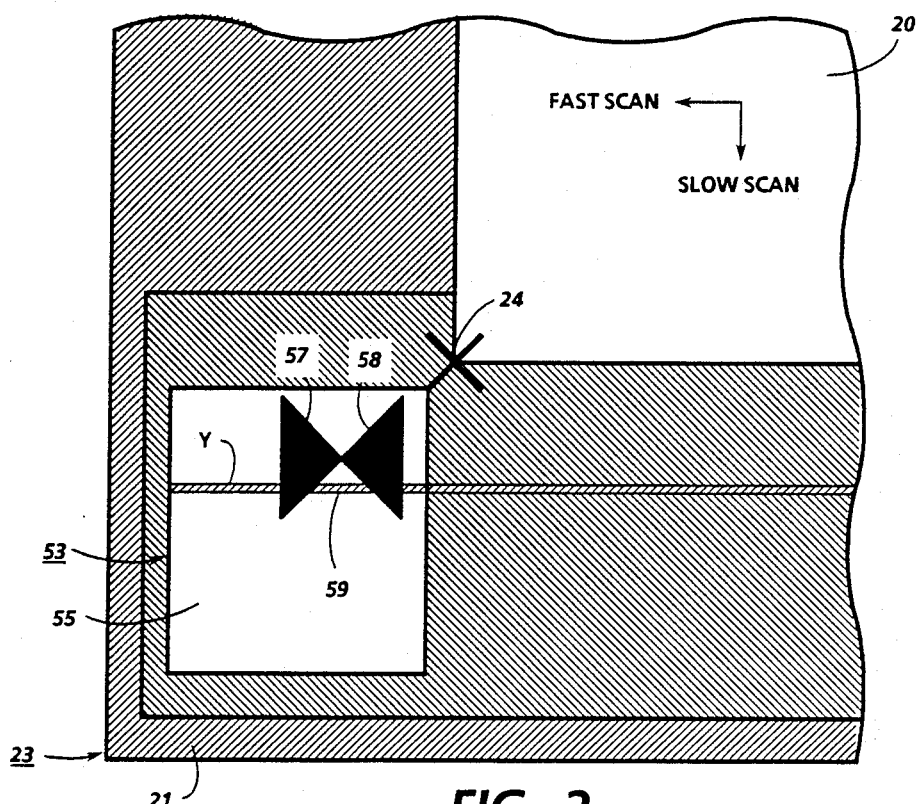
FIG. 2 is a top plan view of a section of the platen of the scanner shown in FIG. 1 depicting the registration target used for effecting registration in the slow scan direction.
Figure 3:
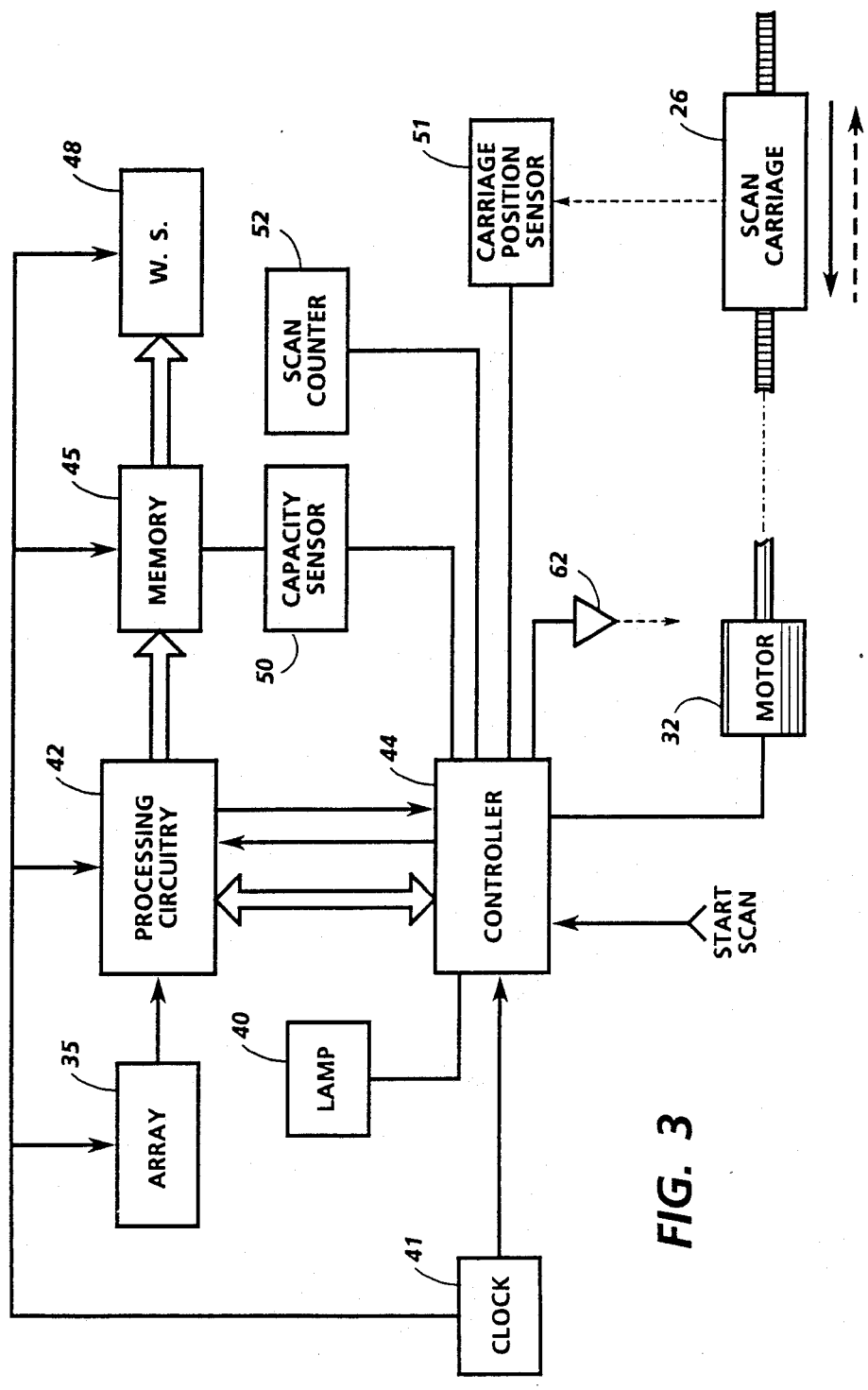
FIG. 3 is a schematic block view showing the principal operating elements of the scanner shown in FIG. 1.
Figure 5:
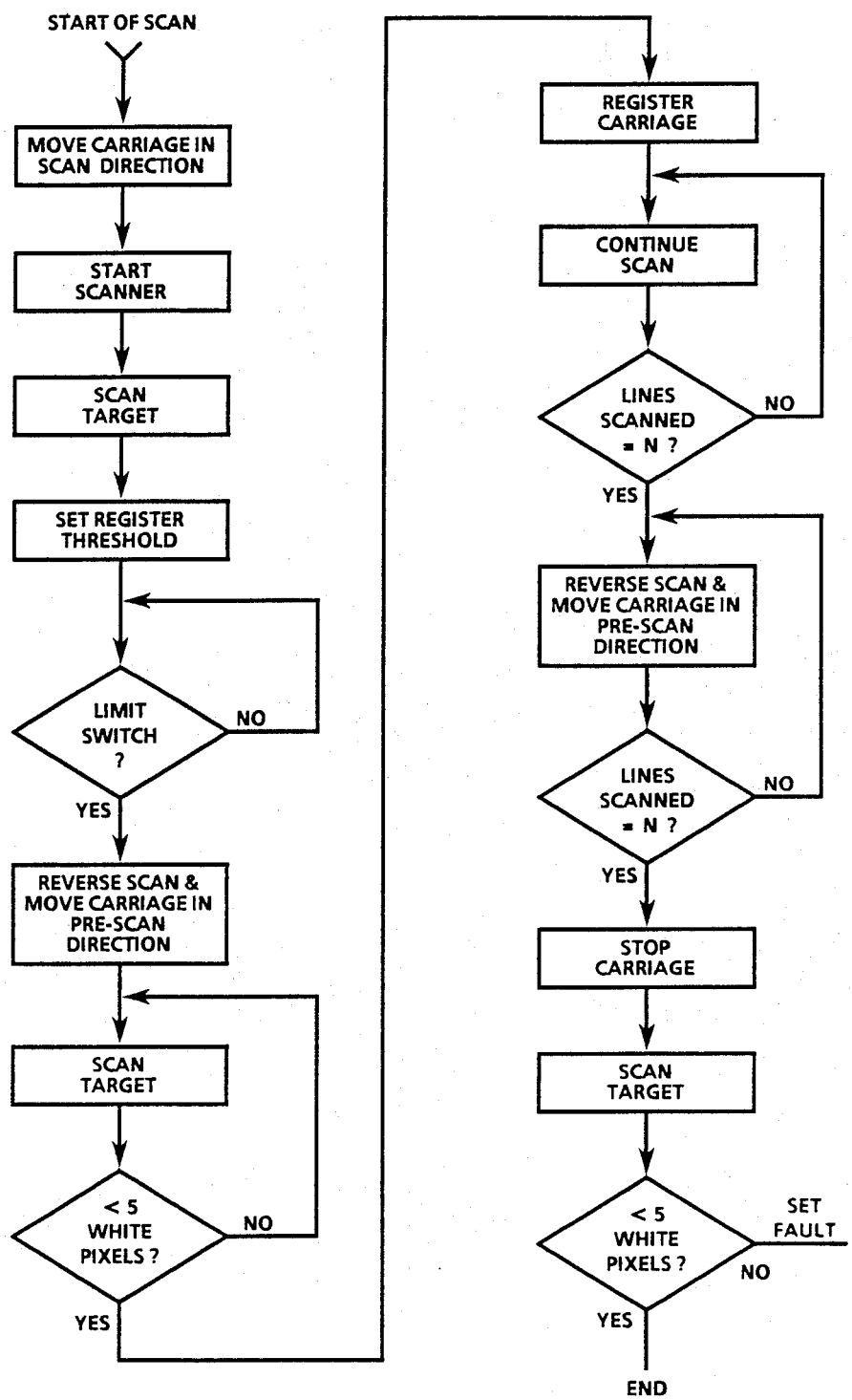
FIG. 5 is a flow chrt depicting the operating procedure for carrying out registration in the slow scan direction.

Referring to FIGS. 1-3, there is shown an exemplary raster input scanner, designated generally by the numeral 10, of the type adapted to incorporate the slow scan registration self alignment system of the present invention. Scanner 10 includes a housing 12 with base 13, sides 15 and ends 16. The top 18 of housing 12 incorporates a generally rectangular transparent platen 20. Platen 20 is formed from a relatively larger piece of transparent material, typically glass, having an opaque border 21 therearound, border 21 delineating a generally rectangular viewing window sized to accommodate the largest document original 22 to be scanned. One corner 23 of border 21, referred to as the registration corner, provides a document registration point 24 for locating the document to be scanned on platen 20. As will be understood, a document 22 to be scanned is located either manually or by a suitable automatic document handler or feeder (not shown) on platen 20 for scanning. A scan carriage 26 is movably supported within housing 12 on base 13 for reciprocable movement in the slow scan direction underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a scan or pre-scan direction as shown by the dotted line and solid line arrows in drawing FIG. 1 respectively.

A scanning array 35 such as a CCD is suitably mounted on scan carriage 26 in predetermined operative relation with platen 20 so as to scan the document resting thereon. Array 35 is disposed so that the scan axis (designated the fat scan direction) is substantially perpendicular to the direction of movement of carriage 26 on rails 29. Suitable optical means, exemplified here by lens 37 and mirrors 38, are provided to focus array 35 on a line-like area extending across the width of platen 20 and perpendicular to the direction of movement of carriage 26. A lamp 40 is provided for illuminating the line-like area on which array 35 is focused. A suitable clock 41 (shown in FIG. 3) provides clock signals for operating the system including driving array 35. The image signals generated by scanning array 35 are converted to digital form by an analog-to-digital (A/D) converter (not shown) and output to suitable image signal processing circuitry 42. Following processing, the image signals representing the document image are output via memory 45 to the user or workstation 48 such as a publishing workstation, personal computer, printer, etc.

Scanner 10 operates asynchronously at a variable scanning rate in response to the demand for image signals by workstation 48. The image signals from array 35, after suitable processing including conversion to digital format, are output to memory 45 which comprises a relatively small First in-First out (FIFO) buffer. A buffer capacity sensor 50 continuously monitors the residual capacity of memory 45. The signal from buffer capacity sensor 50 is used by controller 44 to control carriage drive motor 32 to move carriage 26 and produce valid lines of image signals so as to maintain a predetermined level of image signals in memory 45 for input to workstation 48.

A suitable carriage position sensor 51 is provided to track movement of carriage 26. On movement of carriage 26 with array 35 through a distance equal to one scan line, sensor 51 outputs a signal to controller 44 which responds by sending an integration signal to processing circuitry 42 requesting output of the next valid line of image signals to memory 45. In the absence of an integration signal from controller 44, the lines of image signals output by array 35 while scanning platen 20 are discarded or dumped. A bi-directional scan counter 52, which is preset to a count equal to the total number of scan lines required to complete a scan, is provided. Counter 52 is indexed by 1 each time carriage 26 moves one scan line as sensed by position sensor 50. Control signals output by counter 52 on certain predetermined counts as will appear are fed to controller 44. In the exemplary arrangement described, scan counter 52 is incremented during movement of carriage 26 in the scan direction and decremented on movement of carriage 26 in the pre-scan direction. A variable rate scanning system of the type referred to above is shown and disclosed in copending application Ser. No. 945,156, filed on Dec. 22, 1986, in the name of Gregory E. Bell, incorporated by reference herein.

A precision registration target 53 is attached to the underside of border 21 of platen 20 in registration corner 23. As will appear more fully, target 53 provides a registration reference image (i.e., line y in FIG. 2). Target 53 is located on platen 20 such that the registration reference image is spaced a known distance s from the document registration point 24 on platen 20. Registration target 53, which is sized sufficiently large to extend almost to the outer edge of border 21, comprises a generally rectangular patch of light reflecting material forming a light reference area 55 adjacent the outer end thereof. A pair of dark (i.e., black) triangular images 57, 58 in point to point opposing relation to one another are provided inboard of target 53, the axes of images 57, 58 being substantially parallel with the fast scan direction. As a result, the triangular images 57, 58 cooperate to provide a variable density image area 59 which gradually reduces in size to a minimum at the point where the triangular images meet. The axis of the variable density image area 59 is substantially parallel to the slow scan direction.

A suitable carriage position sensor in the form of limit switch 62 is provided to sense when carriage 26 is positioned such that array 35 is in position to scan reference area 55 of target 33. Since the reference area 55 is relatively large, the placement of switch 62 is not critical.

Figure 4:
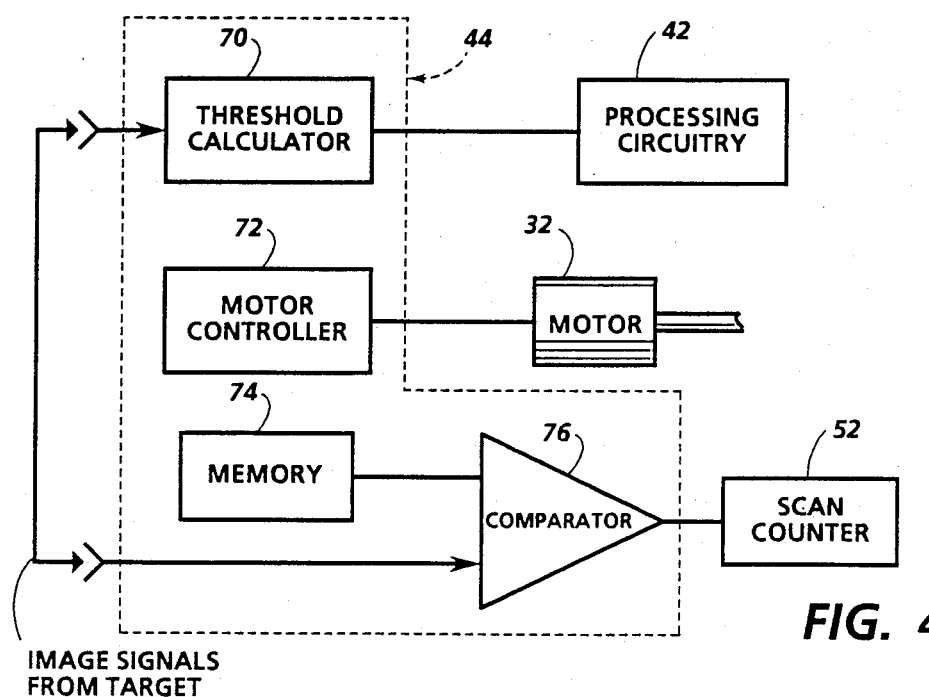
FIG. 4 is a schematic block view showing the principal operating elements of the controller shown in FIG. 3.

Referring to FIGS. 2-4, controller 44 includes, either through hardware or software implementation or a combination of both, a threshold level calculator 70 to establish the threshold level or parameter for use by processing circuitry 42 in processing the image signals output by array 35 when scanning target 53. As will appear, the threshold level is determined from one or more lines of illumination intensity signals output by array 35 at startup of each scanning cycle. Controller 44 includes a motor controller 72 to control the speed and direction of carriage drive motor 32 and a memory 74 for storing a registration reference image for use in registering the position of carriage 26 at the start of a scan cycle. The registration reference image comprises an image line having a preset number of consecutive white pixels (i.e., 5) corresponding to a desired scan line (line y in FIG. 2) in variable density image area 59 of target 53. As will appear, the image lines output by array 35 when scanning the variable density image area 59 are compared with the registration reference image in memory 74 by a comparator 76. When the registration reference image in memory 74 and the target image line output by array 35 match, a carriage registration position is obtained from which the length of scan of carriage is measured by the number of lines scanned. For this, counter 52, which is preset to a count (N) equal to the number of scan lines required to scan the length of platen 20 including the distance s in image lines, is initialized. Comparator 76 also compares the registration position of carriage 26 with the target image line output by array 35 after carriage 26, following return, is stopped following the prescribed number of scan lines to verify a valid scan cycle.

OPERATION

Referring to FIGS. 1-5, on a start scan signal, controller 44 actuates motor 32 to move carriage 26 in the scan direction (the direction shown by the dotted line arrow in FIG. 1). Clock 41 is started and scan lamp 39 and array 35 are actuated to initiate scanning. As carriage 26 moves toward limit switch 62, array 35 scans the light reference area 55 on target 53, outputting image signals representing each line of target 53 scanned to image processing circuitry 42. These image signals of target 53 reflect the current illumination intensity of the system and are fed to controller 44 where threshold level calculator 70 sets a threshold level for processing the subsequent image signals obtained from scanning target 53. While various parameters may be used to set the threshold level, one parameter found acceptable is one-half the illumination intensity measured.

On detectionn of scan carriage 26 by limit switch 62, controller 44 reverses motor 32 to drive carriage 26 in the pre-scan direction shown by the solid line arrow in FIG. 1. As carriage 26 moves from switch 62 toward platen 20, array 35 scans target 53 and the gradually changing image area 59 provided by triangular images 57, 58. The image signals output by array 35 are passed via processing circuitry 42 to comparator 76 of controller 44 which compares each line of image signals with the predetermined reference image in memory 74 representing the desired scan carriage registration position. As scan carriage 26 moves closer to platen 20, the image area 59 of target 53 being scanned by array 35 gradually changes as the white reference area 59 between the dark triangular images 57, 58 becomes smaller and smaller. On detecting an image line having the preset number of consecutive white pixels (i.e., line y), controller 72 temporarily stops motor 32. Scan counter 52, which is preset with a count (N) equal to the number of image lines that comprise the length the viewing window on platen 20 plus a count x equal to the number of image lines in the distance s between document registration point 24 and the registration reference image of target 53, is initialized. Accordingly, the count N in counter 52 provides a count ($N_R$) identifying the registration reference image position, a count ($N_1$[from N-x]) identifying the end-of-scan position (when scanning in the scan direction), and a count ($N_n$) identifying the end-of-scan position (when scanning in the pre-scan direction) and the start-of-scan position (when scanning in the scan direction).

With registration of scan carriage 26 completed, controller 44 actuates motor 32 to drive carriage 26 in the pre-scan direction to scan the length of platen 20 and the document thereon. The image data obtained during document pre-scan is fed via processing circuitry 42 to controller 44 which uses the image data to adjust and set the signal processing parameters of image processing circuitry 42. With each valid line of image signals output, counter 52 is decremented by 1 until the predetermined count (i.e., $N_n$) is reached signifying that scanning of platen 20 is completed. Controller 44 reverses motor 32 to drive carriage 26 in the scan direction. As scan carriage moves, array 35 scans platen 20 and the document thereon to output valid lines of image signals via processing circuitry 42 to memory 45 for workstation 48. With the output of each valid line of image signals, counter 52 is incremented by 1. When counter 52 reaches the start of scan count (i.e., $N_1$), scanning of platen 20 and the document thereon is completed and the output of image signals to memory 45 for workstation 48 is terminated.

As scan carriage 26 continues to move in the scan direction, counter 52 continues to count each time carriage 26 moves one scan line. When counter 52 reaches the scan carriage registration count (i.e., $N_R$), controller 44 de-energizes motor 32, stopping scan carriage 26 in position to scan the next document. Array 35 continues to scan and scans the portion of target 53 currently opposite thereto. The image signals from target 53 output by array 35 are used by comparator 76 of controller 44 to compare with the registration reference image stored in memory 74 to see if the image signal content has the same preset number of consecutive pixels as the registration reference image used to register scan carriage 26.

Where scan carriage 26 is stopped in the same position as the previously established registration position, the image content of the image signals derived from scanning target 53 will be the same as the registration reference image and a valid scan is presumed. Where the scan carriage position is different as evidenced by a difference between the image content of the image signals obtained from scanning target 53 and the registration reference image, a fault flag is set to indicate a potential registration problem. Since the image signals obtained from scanning the document have been processed and output to workstation 48, a rescan is required if the registration problem adversely affects the quality of the image obtained.

While an exemplary scanner is shown and described, other suitable scanner designs and types for effecting relative scanning movement between the image bearing document and the scanning array may be contemplated such as, for example, a scanner of the type where the image document is moved past a scan slit by a document transport for scanning by a stationary array. Further, the invention is not limited to the particular array type described but instead contemplates any array type in which it is desirable to minimize residual charges in the array shift register or shift registers due to asynchronous operation.

While the invention has been described with reference to the structure disclosed, it is not confined to the details set forth, but is intended to cover such modifications or changes as may come within the scope of the following claims.

We claim:

1. A process for operating a raster input scanner having a platen for supporting image bearing documents to be scanned, a movable scan carriage; scanning means on said carriage with at least one scanning array, lamp means for illuminating the document, and optical means for focusing an image line on said array; and a registration target providing a predetermined target image in the scan path of said scanning means adjacent said platen; the steps comprising:
 (a) in response to a start of scan signal, actuating said scanning means and moving said carriage to scan said target image before scanning said platen;
 (b) on output of image signals representing a preset target image, registering the position of said carriage;
 (c) actuating said scanning means and moving said carriage from said registration position to scan said platen while counting each line scanned until a preset number of lines are scanned;
 (d) on scanning of said preset number of lines, moving said carriage in the opposite direction while again counting each line scanned;
 (e) on scanning said preset number of scan lines, stopping said carriage;
 (f) re-scanning said target image to provide image signals representing a return target image; and
 (g) comparing said return target image with said preset target image to verify that the position to which said carriage is returned and said registration position are one in the same.

2. The process according to claim 1 including the steps of:
 (a) on said start scan signal, first actuating said scanning means and moving said carriage in said opposite direction until a predetermined carriage position is reached;
 (b) while moving said carriage in said opposite direction, scanning said target image to provide image signals representing the scanning intensity of said scanning means; and
 (c) using said image signals to provide a thresholding parameter for use in processing subsequent image signals from scanning said target image.

3. The process according to claim 2 including the steps of:
 (a) providing a document registration point for locating a document to be scanned on said platen;
 (b) locating said target image a second preset number of scan lines from said document registration point; and
 (c) distinguishing start of scan of said platen and the document thereon from scan of said target image using said second preset number of scan lines.

4. The process according to claim 3 including the step of:
providing a registration target with a target image having a first image area providing a light reference image and a second image area providing said target image, said target image comprising an image having a density that varies uniformly in the direction of movement of said carriage.

5. A process for operating a raster input scanner having a platen for supporting image bearing documents to be scanned, a movable scan carriage, scanning means on said carriage with at least one scanning array, lamp means for illuminating the document, and optical means for focusing an image line on said array; and a registration target providing a predetermined registration image in the scan path of said carriage adjacent said platen; the steps comprising:
 (a) actuating said scanning means and moving said carriage in a first scanning direction away from said platen;
 (b) on said scan carriage reaching a preset position, reversing said carriage to move said carriage in a second direction;
 (c) scanning said registration target;
 (d) establishing a carriage registration position in response to detection of a preset first target image;
 (e) continuing moving said carriage in said second scanning direction through a predetermined distance from said carriage registration position whereby to scan said platen and the document thereon;
 (f) at said predetermined distance, reversing said carriae to move said carriage in said first scanning direction;
 (g) on moving said carriage through said predetermined distance, scanning said registration target to provide a second target image;
 (h) comparing said first and second target images with one another to verify that the position of said carriage when scanning said registration target for said second target image is identical to said carriage registration position.

6. In a scanner having a platen on which documents are placed for scanning; a scan carriage; and image scanning means on said carriage with at least one array of photosensors, lamp means for illuminating a line-like area of said platen for scanning by said array, and optical means for focusing said line-like area on said array, the combination of:
 (a) reversible drive means for moving said carriage;
 (b) control means for operating said drive means and said scanning means;
 (c) a registration target having a predetermined target image in the scan path of said scanning means adjacent said platen;
 (d) said control means on a start of scan signal actuating said scanning means and said drive means to move said carriage so that said scan means scans said target image prior to scanning said platen;
 (e) means responsive to output of a preset target image by said scanning means to register the position of said carriage;
 (f) counting means for counting each line scanned by said scanning means as said scanning means scans said platen;
 (g) said control means actuating said drive means to move said carriage in the opposite direction back toward said carriage registration position in response to said counting means counting a predetermined number of scan lines;
 (h) said control means inactivating said drive means to stop said carriage in response to said counting means counting said predetermined number of scan lines while maintaining said scanning means operative to re-scan said target image and provide a second target image; and
 (i) means for comparing said preset target image with said second target image to verify that said carriage is returned to said registration position.

7. The scanner according to claim 6 including:
 (a) carriage sensing means for detecting said carriage when said carriage reaches a predetermined position upstream of said target;
 (b) said control means on said start of scan signal first actuating said drive means to move said carriage in said opposite direction whereby said scanning means scans said target image to provide image signals representing the scan intensity of said scanning means, said control means actuating said drive means to move said carriage in the opposite direction response to a signal from said carriage sensing means on said carriage reaching said predetermained position; and (c) means responsive to said image signals to establish a threshold level for processing subsequent image signals output by said scanning means when scanning said target image.

8. The scanner accroding to claim 7 including:
means providing a document registration position for locating documents for scanning on said platen,
said target being positioned a predetermined number of scan lines from said target.

9. The scanner according to claim 8 in which
said target image comprises a first image section providing a light reference image and a second image second providing said target image, said target image having a density that varies uniformly in the direction of movement of said carriage.

10. In a scanner having a platen on which documents are placed for scanning, a scan carriage having image scanning means thereon including at least one array of photosensors lamp means for illuminating a line-like area of said platen for scanning by said array, and optical means for focusing said line-like area on said array, the combination of:

(a) reversible drive means for moving said carriage in either a first or second scanning direction;

(b) control means for controlling said drive means, said control means actuating said drive means to move said carriage in said first scanning direction in response to a start scan signal;

(c) carriage sensor means responsive to said carriage for outputting a carriage detection signal to said control means, said control means actuating said drive means to reverse said carriage and move said carriage in said second direction in response to said carriage detection signal whereby said scanning means scans towards said platen;

(d) a registration target adjacent said platen in the path of said scanning means whereby said scanning means scans said target to provide image signals of said registration target as said carriage moves in said second scanning direction;

(e) means responsive to a preset image signal output by said scanning means to establish a registration position for said carriage;

(f) said scanning means scanning said platen as said carriage moves in said second scanning direction, said control means on movement of said scan carriage through a predetermined distance actuating said drive means to reverse said carriage and move said carriage with said scanning means in said first direction toward said registration position;

(g) said scanning means re-scanning said target following return movement of said carriage through said predetermined distance; and (h) means for comparing the image signals output of said scanning means when re-scanning said target with said preset image signal output to determine if said carriage has returned to said registration position.

* * * * *